US011132714B2

(12) United States Patent
Chiang (10) Patent No.: US 11,132,714 B2
(45) Date of Patent: Sep. 28, 2021

(54) SERVICE CARRIER IDENTIFICATION AND DISPLAY

(71) Applicant: T-Mobile USA, Inc., Bellevue, WA (US)

(72) Inventor: Hsin-Fu Henry Chiang, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 552 days.

(21) Appl. No.: 15/393,500

(22) Filed: Dec. 29, 2016

(65) Prior Publication Data

US 2018/0189838 A1 Jul. 5, 2018

(51) Int. Cl.
*G06Q 30/02* (2012.01)
*H04W 4/12* (2009.01)
*H04M 1/2746* (2020.01)
*H04M 1/27453* (2020.01)
*H04M 1/724* (2021.01)

(52) U.S. Cl.
CPC ...... *G06Q 30/0267* (2013.01); *H04M 1/2746* (2020.01); *H04M 1/27453* (2020.01); *H04M 1/724* (2021.01); *H04W 4/12* (2013.01); *H04M 2250/66* (2013.01)

(58) Field of Classification Search
CPC ........... H04W 4/16; H04W 4/12; H04W 4/18; H04W 12/06
See application file for complete search history.

(56) References Cited

U.S. PATENT DOCUMENTS

| | | | | |
|---|---|---|---|---|
| 2003/0190025 | A1* | 10/2003 | Okamura | H04M 1/2745 379/142.17 |
| 2007/0165613 | A1* | 7/2007 | Soo | H04L 29/06027 370/356 |
| 2008/0182552 | A1* | 7/2008 | Dinh | H04L 12/66 455/408 |
| 2010/0167763 | A1* | 7/2010 | Bouthemy | H04L 45/16 455/466 |
| 2010/0322396 | A1* | 12/2010 | Southerland | H04M 1/575 379/88.19 |
| 2014/0006591 | A1* | 1/2014 | Davis | H04W 48/18 709/224 |
| 2014/0136441 | A1* | 5/2014 | Agarwalla | G06Q 30/0241 705/344 |

* cited by examiner

*Primary Examiner* — Muthuswamy G Manoharan
(74) *Attorney, Agent, or Firm* — Lee & Hayes, P.C.

(57) ABSTRACT

An application such as a contacts management application may be configured to display information for multiple contacts. The displayed information may include carrier information for certain contacts, indicating which of multiple cellular communication carriers provides cellular communication services for each contact. This may allow a user to provide recommendations to the user's contacts, such as promotional messages suggesting that the contacts switch to the carrier of the user. In some embodiments, a control may be displayed that automatically initiates a promotional message to a particular contact.

20 Claims, 7 Drawing Sheets

| | | | | |
|---|---|---|---|---|
| Usage Details | | | | |
| Date & Time — 508(a) | Destination — 508(b) | Number — 508(c) | Min — 508(d) | Type — 508(e) | |
| 11/11/2015, 09:27 AM | Incoming | 555-555-0100 | 1 | Carrier A to Carrier A | |
| 11/10/2015, 06:40 PM | Incoming | 555-555-0137 | 4 | Carrier B to Carrier A | Invite — 510 |
| 11/10/2015, 06:29 PM | Bellevue, WA | 555-555-0121 | 2 | Carrier A to Carrier A | Invite |
| 11/10/2015, 05:30 PM | Bellevue, WA | 555-555-0134 | 65 | Carrier A to Carrier C | Invite |
| 11/09/2015, 06:25 PM | Bellevue, WA | 555-555-0193 | 3 | Carrier A to Carrier C | Invite |
| 11/09/2015, 05:24 PM | Bellevue, WA | 555-555-0156 | 5 | Carrier A to Carrier A | Invite |
| 11/09/2015, 09:35 AM | Bellevue, WA | 555-555-0111 | 18 | Carrier A to Carrier B | Invite |
| 11/08/2015, 04:20 PM | Bellevue, WA | 555-555-0111 | 2 | Carrier A to Carrier B | Invite |
| 11/08/2015, 03:45 PM | Bellevue, WA | 555-555-0144 | 1 | Carrier A to Carrier C | Invite |
| 11/08/2015, 11:52 AM | Bellevue, WA | 555-555-0167 | 2 | Carrier A to Carrier B | Invite |

SERVICE CARRIER IDENTIFICATION AND DISPLAY

BACKGROUND

Mobile communications are supported by multiple different cellular communication carriers, each of which may have its own communication infrastructure. A cellular communication infrastructure may include antennas, towers, radio equipment, wired networking components, signal and data transmission lines, etc. Such a carrier infrastructure may support multiple types of communications such as voice and data, and may also support other services such as text messaging and chatting, video calling, screen sharing, file sharing, emoticons, location sharing, and so forth.

An individual communication device such as a handset or smartphone is typically configured to subscribe to the services of an individual carrier and to communicate through that carrier's infrastructure. However, the carriers interoperate with each other so that subscribers of one carrier can communicate and exchange data with the subscribers of other carriers.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

The described implementations provide devices, systems, and methods for displaying information regarding a user's contacts, and for displaying information regarding the different cellular communication carriers used by the contacts. In particular, on a display or graphical user interface (GUI) that lists one or more contacts or telephone numbers, additional information may be displayed to indicate, for each telephone number or contact, the cellular communication carrier that provides cellular communication services for that telephone number or contact. The additional information, referred to herein as a carrier identifier, may by in the form of text such as the name of the carrier. Alternatively, or in addition, carrier identifier may comprise a logo or other graphical element associated with the carrier.

In certain embodiments, the contact information is presented to a user of a device that is supported by a first cellular communication carrier, while some of the contact information may relate to other users who are supported by other cellular communication carriers. The carrier identifier may therefore indicate carriers other than the first cellular communication carrier.

In some embodiments, a selectable control may also be displayed along with the carrier identifier of a contact, particularly for contacts supported by other cellular communication carriers. The control may comprise a button or link that can be selected to initiate a message to the contact. The message may comprise a promotional message, as an example, suggesting that the recipient switch carriers to the first cellular communication carrier, which is the carrier of the user viewing the contact information.

In some embodiments, the carrier identifier may be obtained by querying a network-accessible mapping service. For example, such a query may specify a cellular telephone number of a particular contact, and a response to the query may indicate information from which the cellular carrier of the contact can be determined. In some cases, for example, the query response may indicate an Internet Protocol (IP) service address that includes a username and a hostname. The hostname may include a domain name of the carrier that provides cellular services for the contact, and the carrier identifier can therefore be determined from the domain name. In some cases, the IP service address may be obtained by querying an E.164 Number to URI Mapping (ENUM) server or service.

Figure 1:
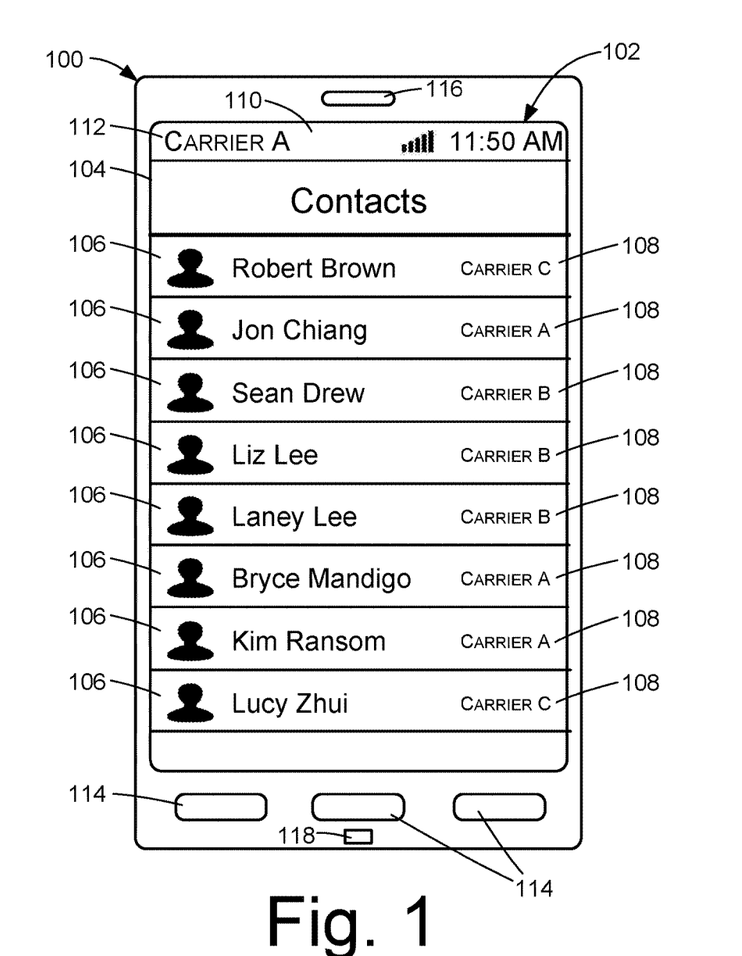
FIGS. 1 and 2 show an example graphical user interface (GUI), displayed on a communication device, that shows carrier IDs for multiple contacts.

FIG. 1 shows a communication device 100 having a touch-sensitive display 102 upon which an example graphical user interface (GUI) 104 is displayed. The communication device 100 may have wireless, cellular communication capabilities, and may be associated with and supported by a cellular communications carrier. When communicating, the communication device 100 communicates wirelessly through the communication infrastructure of the cellular communications carrier, and the cellular communications provider may extend the communications to the different devices, to services of the carrier and other carriers, to the Internet and/or to various other services, servers, and entities.

In FIG. 1, the communication device 100 is shown as a smartphone. More generally, however, the communication device 100 may comprise any type of device, not limited to a telecommunication device. For example, the communication device 100 may comprise a desktop computer, a laptop computer, a wearable device such as a smartwatch, a television, a gaming device, etc. The communication device 100 may in some cases lack cellular communication capabilities, and may instead have non-cellular networking capabilities such as Wi-Fi or Ethernet networking capabilities.

A portion of the GUI 104 displays contact information for multiple contacts of the user of the communication device 100. The GUI 104 may be generated and displayed by a contact manager application that runs on the communication device 100, and which stores the contact information in a contacts database.

The contact information in this example is displayed in multiple entries or rows 106, each of which corresponds to a contact. A contact is typically a person, business, or entity that is known to the user of the communication device 100.

Various contact information may be displayed in each entry 106. In the illustrated example, each entry 106 shows the textual name of the corresponding contact and a picture of the contact (represented by in FIG. 1 by an icon on the left side of each entry). In addition, a carrier identifier (ID) 108 is displayed as part of each entry 106. For a particular entry 106, corresponding to a particular contact, the carrier ID 108 identifies the cellular communications carrier to which the contact is subscribed for cellular communication services. More particularly, the carrier ID 108 identifies the cellular communications carrier to which the communication device of the contact is subscribed and from which the communication device receives cellular communication services. As will be explained in more detail below, the carrier ID 108 for each contact is determined using the cellular telephone number of the contact.

In the example of FIG. 1, the carrier IDs 108 comprise the text strings "Carrier A", "Carrier B", and "Carrier C". In implementation, each of these textual designations may comprise the name of an actual carrier, such as "T-Mobile", "AT&T", "Verizon", etc. Note that the carrier to which the device 100 itself is subscribed may be indicated in a status bar 110 of the display 102. In the illustrated example, a carrier field 112 indicates that the device 100 is subscribed to use the cellular services of "Carrier A". For purposes of discussion, the carrier that supports the device 100, which in this example is Carrier A, will be referred to as the "home" carrier. Other carriers, such Carrier B and Carrier C, will be referred to as "foreign" carriers.

In addition to the display 102, the communication device 100 may have one or more buttons or other physical controls 114, a speaker 116, and a microphone 118. The communication device 100 may have other controls and/or input/output devices that are not shown.

Figure 2:
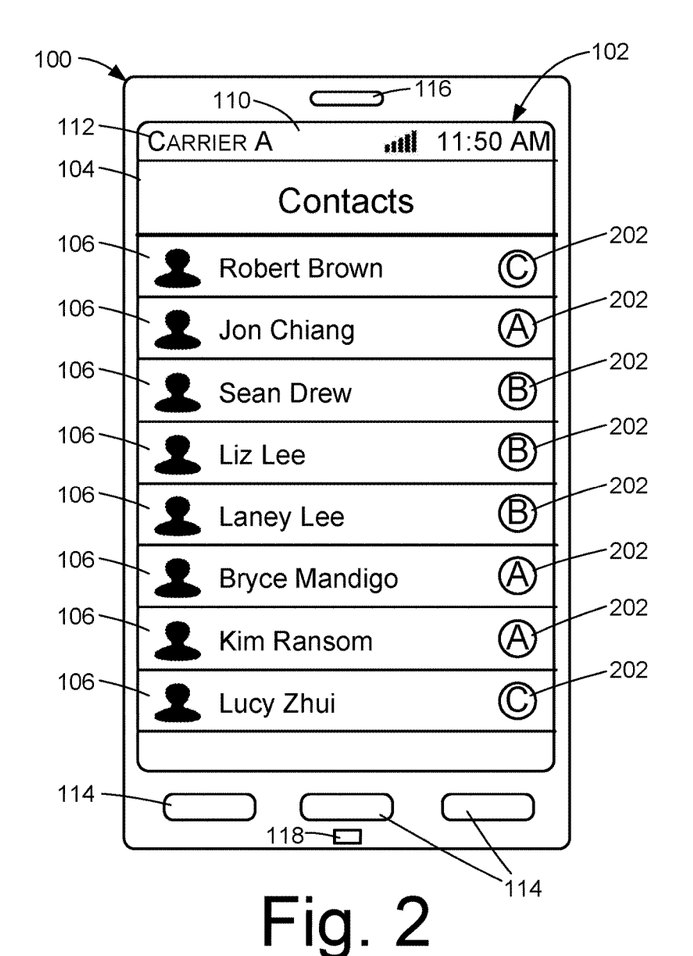

FIG. 2 illustrates an alternative embodiment having different carrier IDs 202, which in this example are graphical designs such as company logos. For purposes of illustration, the logos are represented as circles that enclose the letter "A", "B", or "C", corresponding to the "Carrier A", "Carrier B", and "Carrier C" IDs of FIG. 1. In actual implementation, these logos might comprise actual commercial logos or other graphics associated with the carriers. In other respects, the GUI 104 of FIG. 2 is the same as that shown in FIG. 1.

Figure 3:
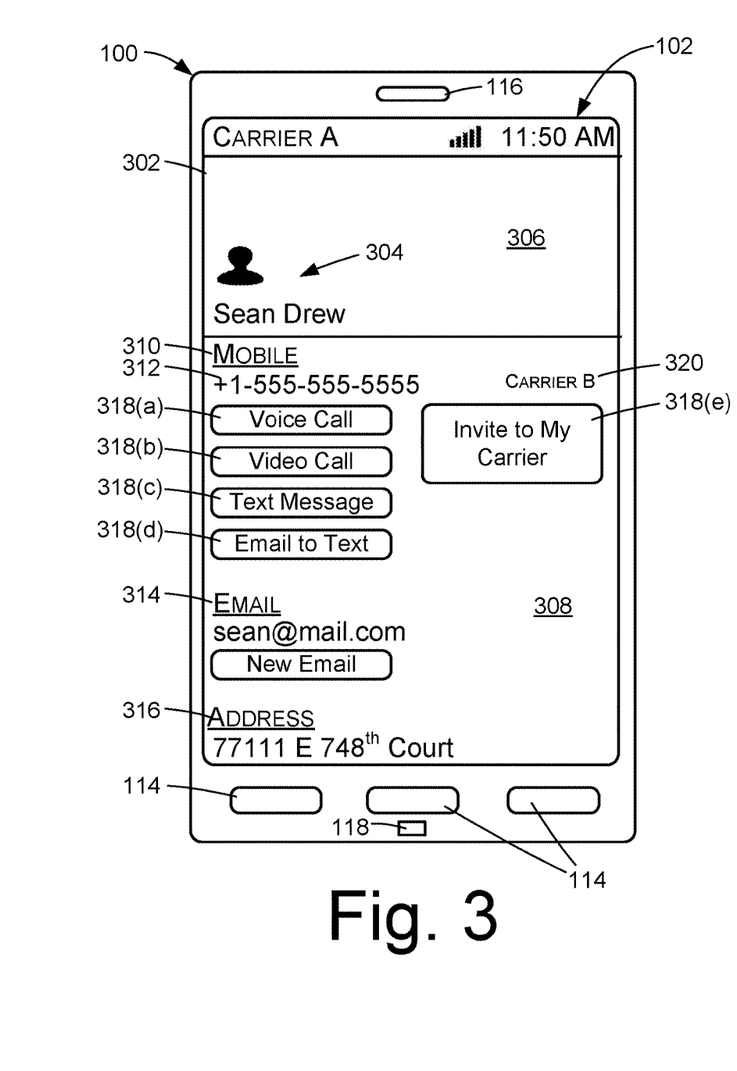
FIG. 3 shows an example GUI, displayed on a communication device, that shows details regarding a selected contact.

FIG. 3 illustrates a contact detail GUI 302 that may be generated on the display 102 by the contact manager application of the device 100 in response to user selection of one of the entries 106 of FIG. 1 or FIG. 2. In the smartphone environment, a user may select an entry 106 by touching it on the display 102. In other environments, the user may select an entry 106 by moving an on-screen pointer to the entry.

The contact detail GUI 302 identifies a contact 304 in a header section 306. In this example, the contact 304 is identified by the name of the contact and by a picture of the contact. Contact information corresponding to the contact 304 is shown in a detail section 308. Among other information, the detail section 308 may include information under a "Mobile" heading 310. The information under the "Mobile" heading 310 includes and relates to a cellular telephone number 312 of the contact. The detail section 308 may also include other headings and corresponding information, which in this example include an "Email" heading 314 and an "Address" heading 316.

The information within the "Mobile" portion of the GUI 302, under the "Mobile" heading 310, may include various selectable buttons or controls 318, which may be selected by a user of the device 100 to perform different actions with respect to the displayed cellular telephone number 312. For example, a "Voice Call" control 318(a) may be selected to initiate a voice call to the telephone number 312. A "Video Call" control 318(b) may be selected to initiate a video call to the telephone number 312. A "Text Message" control 318(c) may be selected to initiate a text message to the telephone number 312.

The controls 318 may include an "Email to Text" control 318(d) that can be selected to initiate a text message to the telephone number 312 using email. More specifically, different carriers typically specify formats for email addresses so that an originating user can send an email to a carrier, and when the email is received by the carrier the email is forwarded by the carrier as a text message to the designated recipient. For example, a hypothetical carrier "mycarrier" might specify that emails sent to the email domain of the carrier in a format such as "number@email.mycarrier.com", where number is the cellular telephone number of the desired recipient, will be forwarded as text messages to the cellular device associated with the number parameter.

In response to the "Email to Text" control 318(d) being selected, the contact manager application determines the cellular communication carrier associated with the telephone number 312 of the displayed contact and looks up the email address format that is used by that carrier. The contact management application then constructs an email address using the telephone number 312 and the determined email address format, and initiates an email using that email address. In practice, the contact management application might initially open an email application of the device 100, causing the email application to open a graphical email "compose" interface, where the destination field is pre-populated in accordance with the email address format specified by the carrier that provides cellular communication services to the contact 304.

The controls 318 may also include an "Invite" control 318(e) that can be selected by the device user to invite the contact 304 and/or to recommend the home carrier of the user to the contact 304. More generally, when displaying contact information for a contact that subscribes to cellular communication services from a foreign carrier, the contact management application may display a control such as the invite control 318(e), which when selected initiates a communication on behalf of the user to invite the contact 304 to switch to the home carrier of the user.

As an example, suppose that the device 100 receives cellular communication services from Carrier A and the telephone number 312 is indicated by a carrier ID 320 to be associated with Carrier B. In cases such as this where the displayed contact is associated with a foreign carrier, the control 318(e) may be displayed. Selecting the control 318(e) initiates a communication to the contact 304, containing text that may be pre-specified by Carrier A. For example, the text may be a promotional message, and may mention that the user of the device 100 has recommended Carrier A. In one implementation, selecting the invite control 318(e) automatically sends an SMS text message with such text to the telephone number 312, without further user intervention. In other embodiments, selecting the "Invite" control 318(e) might initially open a text messaging application of the device 100, causing the text messaging application to open a graphical "compose" interface, where the destination field is pre-populated with the telephone number 312 and the message body is pre-populated with the promotional text described above. In other embodiments, selecting the "Invite" control 318(*e*) might send a text message with the promotional text to the user of the device 100, and the user may then forward the message to the contact 304.

Figure 4:
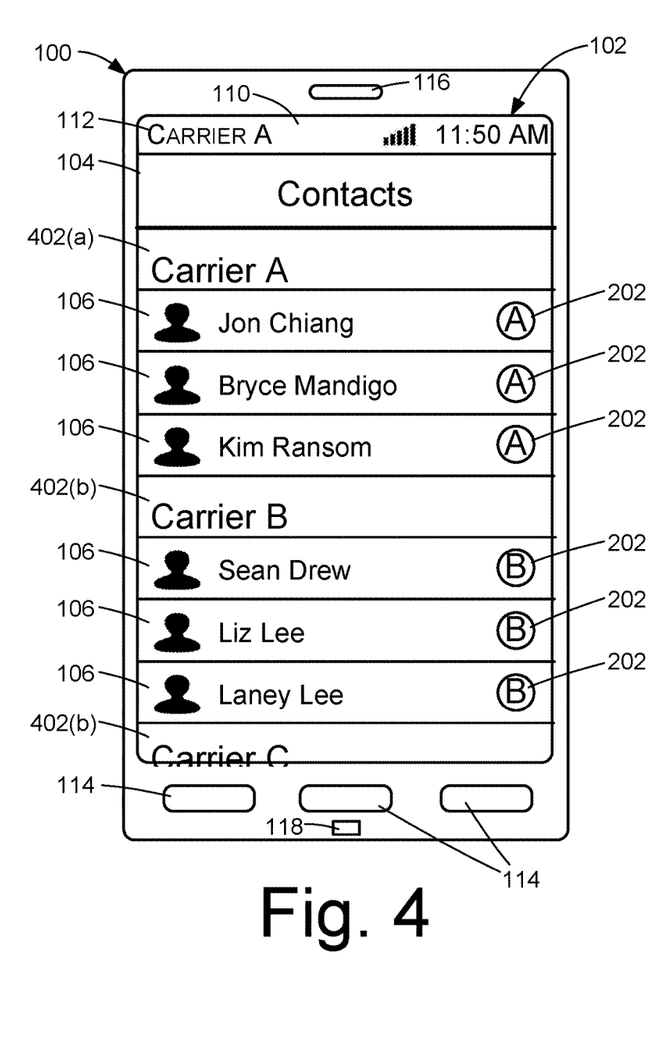
FIG. 4 shows an example GUI, displayed on a communication device, in which a list of contacts is grouped by carrier.

FIG. 4 illustrates another example, similar to that of FIGS. 1 and 2, of displaying contact information for multiple contacts. In this example, the GUI 104 is configured to group the entries 106 by carrier. More specifically, the GUI 104 visibly distinguishes between multiple groups of contacts, wherein each group contains those contacts for which a single communication carrier provides cellular communication services. Each group has an associated heading 402 that shows the name of a carrier. Beneath each heading are the entries 106 for contacts that subscribe to the services of the carrier.

Figure 5:
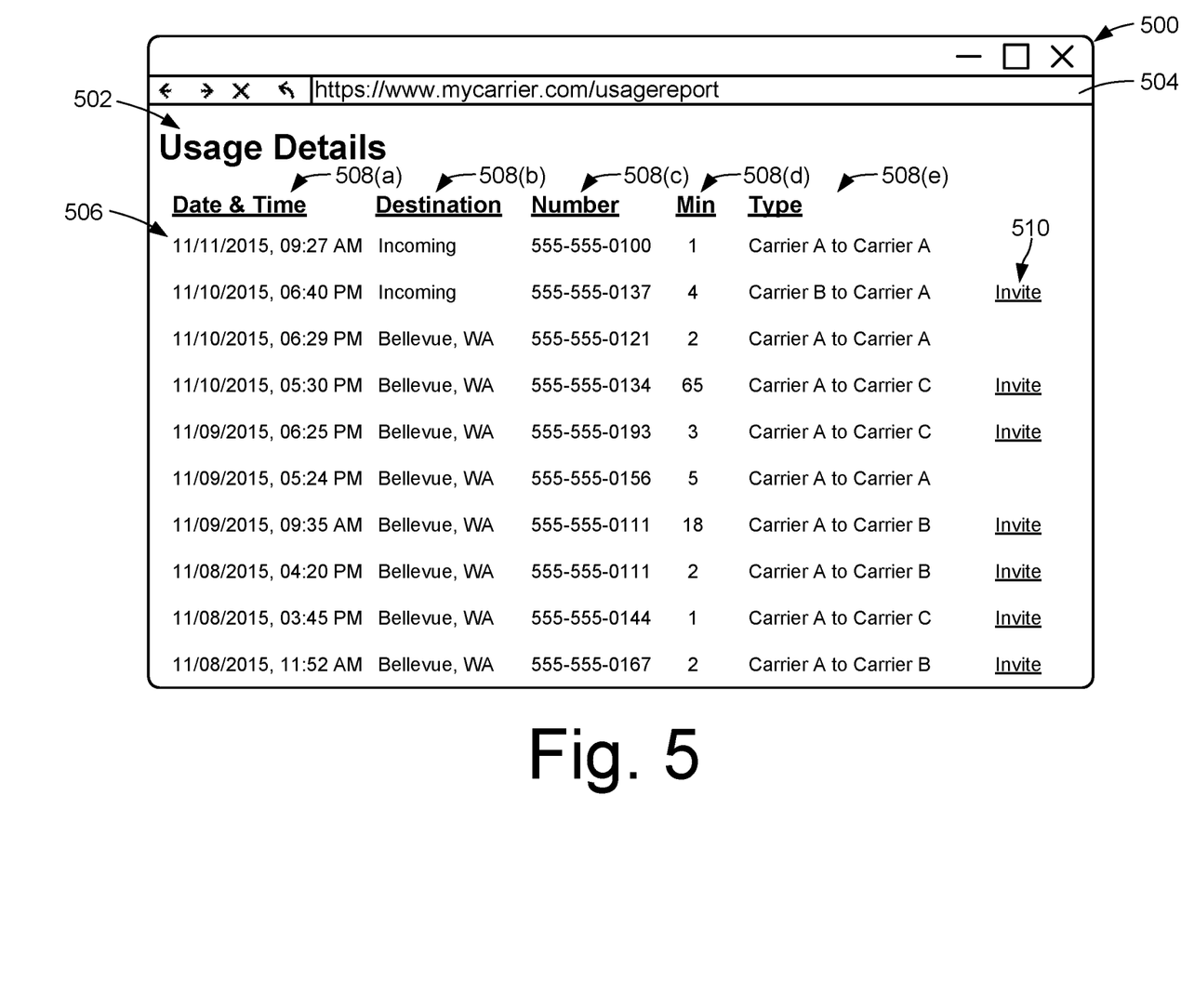
FIG. 5 shows an example GUI, such as may be displayed by an Internet browser, that shows usage data for a particular cellular telephone line.

FIG. 5 shows an example GUI 500 that shows carrier information for multiple contacts of an account holder. In this example, the GUI 500 is a call history and the contacts comprise people or entities that the account holder has called or from which the account holder has received calls.

In particular, FIG. 5 shows a call history 502, also referred to as a call log, for the account holder and for a particular cellular telephone line that is associated with a user. For purposes of discussion, it will be assumed that the telephone line and associated number are associated with and supported by a home carrier, which in this example is assumed to be Carrier A. That is, the communication device associated with the account holder's cellular telephone number receives cellular communication services from Carrier A.

In this example, the call history 502 is shown within a display window such as might be generated by an Internet browser, showing content of a website maintained by the home carrier to allow its customers to access account information. Accordingly, the GUI 500 may have a navigation bar 504 that the account holder can use for Internet navigation.

In the described embodiment, the call history 502 is presented as a table with multiple rows 506 and multiple columns 508. Each row 506 corresponds to a single call or other communication between the account holder's communication device and the communication device of another user. The columns include a "Date & Time" column 508(*a*) showing the dates and times of the calls. The columns may also include a "Destination" column 508(*b*). In the case of outgoing calls from the device of the account holder, the "Destination" column 508(*b*) shows the geographic region associated with the telephone number of the other user's communication device. In the case of incoming calls from other devices, the "Destination" column 509(*b*) indicates simply "Incoming." The columns may also include a "Number" column 508(*c*) showing the telephone number of the other user, regardless of whether the call was an incoming call or an outgoing call. The columns may include a "Min" column 508(*d*) showing the duration of the call in minutes.

The columns 508 may also include a "Type" column 508(*e*), indicating the carrier IDs of the carriers of the two telephone numbers involved in the call. When a particular row indicates "Carrier A to Carrier B," this means that the call was placed from a communication device supported by Carrier A and was received by a communication device supported by Carrier B. In this example the carrier IDs in the "Type" column 508(*e*) are text, although they might comprise logos in other embodiments.

When a row 506 indicates a foreign carrier in the Type column 508(*e*), an "Invite" control 510 is also associated with the row and shown to the right of the row. In response to selection of the "Invite" control 510 corresponding to a particular row and telephone call, the GUI 500 initiates an SMS text message to the telephone number of the communication device of the other user, which is indicated by column 508(*c*). The text message may contain a promotional message, inviting the recipient to switch carriers from the recipient's carrier to the home carrier of the user, for example, and may mention that the account holder recommends the home carrier. In other embodiments, selection of the "Invite" control 510 may initiate an SMS text message to the account holder, containing the same or similar text, which the account holder may forward to the user of the foreign carrier.

Figure 6:
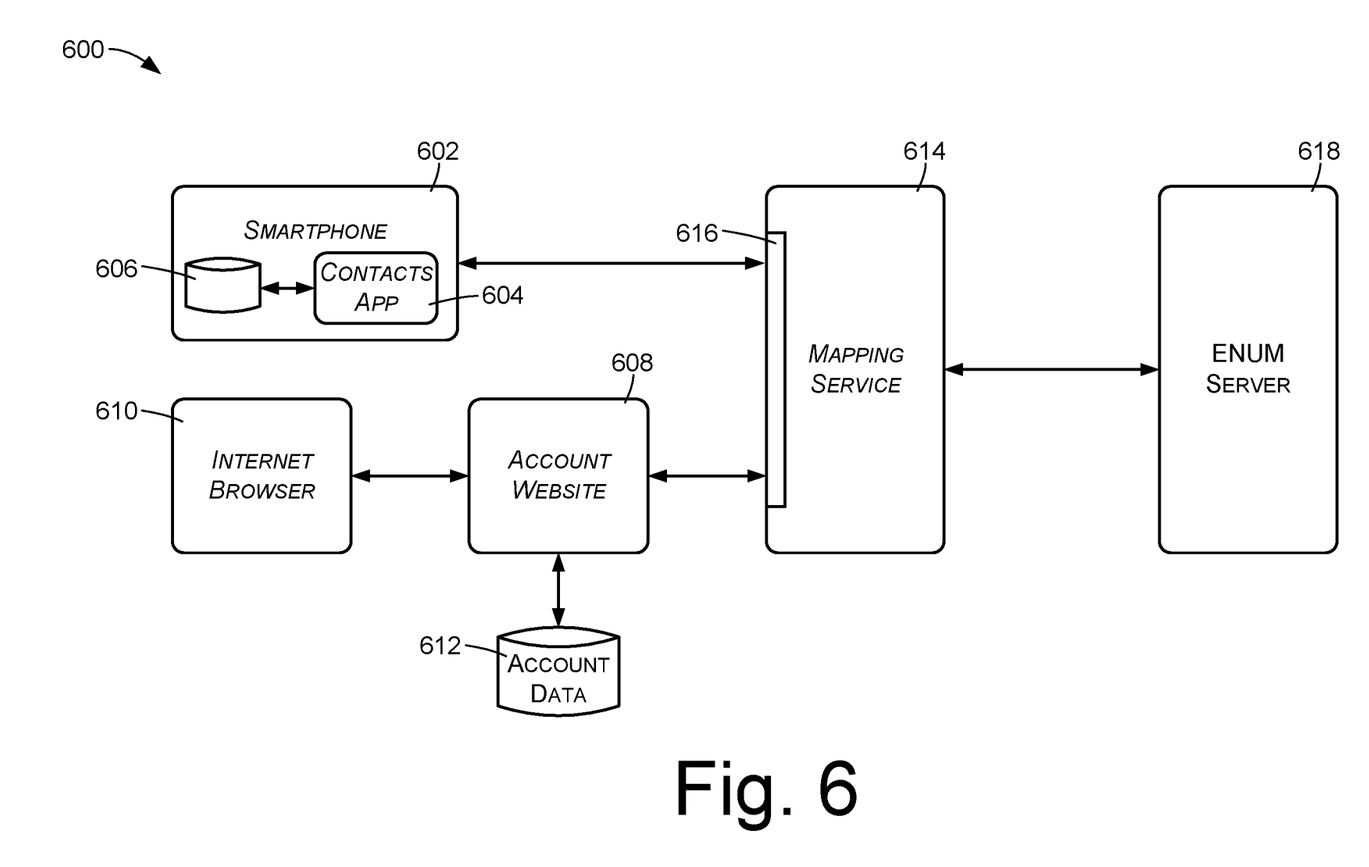
FIG. 6 is a block diagram showing example components, servers, and/or services that may be used to implement certain functionality described herein.

FIG. 6 shows an example environment 600 in which the techniques and GUIs described above may be implemented. FIG. 6 shows a smartphone 602 as an example of a mobile device upon which GUIs such as shown in FIGS. 1-4 might be implemented. The smartphone 602 has a contacts manager application 604 that maintains and/or accesses a contacts database 606. The contacts database 606 stores the contact information described above, which includes names of multiple contacts and corresponding cellular telephone numbers, as well as other information for each contact. The contacts database 606 is shown as residing on the smartphone 602, although it could alternatively reside on an external storage device and/or a network-accessible service or device.

FIG. 6 also shows an account website 608 as an example of a website that might generate and/or provide the GUI shown in FIG. 5. For example, the account website 608 may be a website maintained by a cellular communication carrier, and may be accessed by customers of the carrier to view account information. FIG. 6 shows a hypertext markup language (HTML) Internet browser 610 such as may be used to access and view the account website 608.

The account website 608 may be implemented by a server or by multiple servers. The account website 608 may access an accounts database 612, which may be maintained by the cellular communication carrier to store account data for the carrier's customers.

Note that any of the GUIs shown in FIGS. 1-5 may be generated by any type of application, including web-based applications that run on network-accessible servers and that provide graphics information to network-based clients, as well as applications that are installed to run on individual user devices such as smartphones, tablet computers, laptop computers, smartwatches, etc.

The environment 600 includes a mapping service 614 that is accessed by the smartphone 602 and/or by the account website 608 to map cellular telephone numbers to respective uniform resource identifiers (URIs), as will be described in more detail below. The mapping server 614 exposes a network application programming interface (API) 616 that can be called by external entities such as the contacts application 604 and/or the account website 608.

In various embodiments, the mapping service 614 may comprise one or more servers that provide web services to network-based clients, and that are accessible through wide-area networks such as the Internet. In other embodiments, the mapping service 614 may comprise an IP Multimedia Subsystem (IMS) application server that is part of a cellular communication infrastructure, and may be accessed through the cellular or IMS communication infrastructure rather than through the Internet.

Generally, communications between the components shown in FIG. 6 may be over a data communications network or a combination of data communication networks (not shown). Such networks may include the Internet and other wide-area networks, and may include both public networks (such as the Internet) and private networks (such as communication infrastructures of cellular communication carriers). The components may use various types of communication technologies to access the networks, including wireless communication technologies such as cellular communications and Wi-Fi, as well as wired communication technologies such as Ethernet.

The API 616 may be based on any of various formats and protocols, such as Hypertext Transfer Protocol (HTTP) over Extensible Markup Language (XML), JavaScript Object Notation (JSON), Simple Object Access Protocol (SOAP), etc.

In operation, the contacts application 604 or the account website 608 submits queries to the mapping server 614 through the API 616 to obtain information that identifies the carriers associated with different cellular telephone numbers. This information is returned in response to the queries.

In order to determine information that uniquely identifies the carrier of a particular cellular telephone number, the mapping service 614 may use the services of an E.164 Number to URI Mapping (ENUM) server 618. E.164 is a standard that defines a numbering plan for the world-wide public switched telephone network. ENUM is widely deployed for mapping between E.164 telephone numbers and Internet Protocol (IP) service addresses. An ENUM server is a server that provides this mapping information to requesting clients, based on integrated databases representing the customers of many different carriers. A client can make an ENUM Domain Name Service (DNS) call to the ENUM server 618, specifying an E.164 telephone number. In response, the ENUM server 618 returns a collection of Uniform Resource Identifiers (URIs), corresponding to different services or resources that are associated with the E.164 telephone number. The services or resources to which the URIs correspond may include Session Initiation Protocol (SIP) services, Multimedia Messaging Services (MMS), email services, telephone services, fax services, etc.

The returned collection of URIs may be formatted in accordance with respective URI schemes, which correspond to different services and resources. As an example, a returned URI may comprise a SIP URI. A SIP URI may be of the format "sip:x@y", where x is a username and y is a hostname. For a SIP URI corresponding to a particular telephone number, the username may at times correspond to the telephone number itself. The hostname may include an Internet or Internet Protocol (IP) domain that provides SIP services for the telephone number and/or for the device associated with the telephone number. As an example, a SIP URI corresponding to the telephone number "555-555-0111" may comprise the text string "5555550111@phonesystem.carrier.com", where "carrier.com" is the domain of the cellular communication carrier that provides SIP communication services for the device having the telephone number "555-555-0111". In practice, this domain can be used to uniquely identify the cellular communication provider that provides cellular communication services to the device, because each cellular communication provider has one or more unique domains that are used to provide communication services.

As another example, a returned URI may comprise a "mailto" URI, which may correspond to services such as MMS services and email services. A "mailto" URI may have the same or a similar format as the SIP URI described above, comprising a username and a hostname, where the hostname may include a domain name of the carrier that provides services to the device associated with the queried telephone number.

Figure 7:
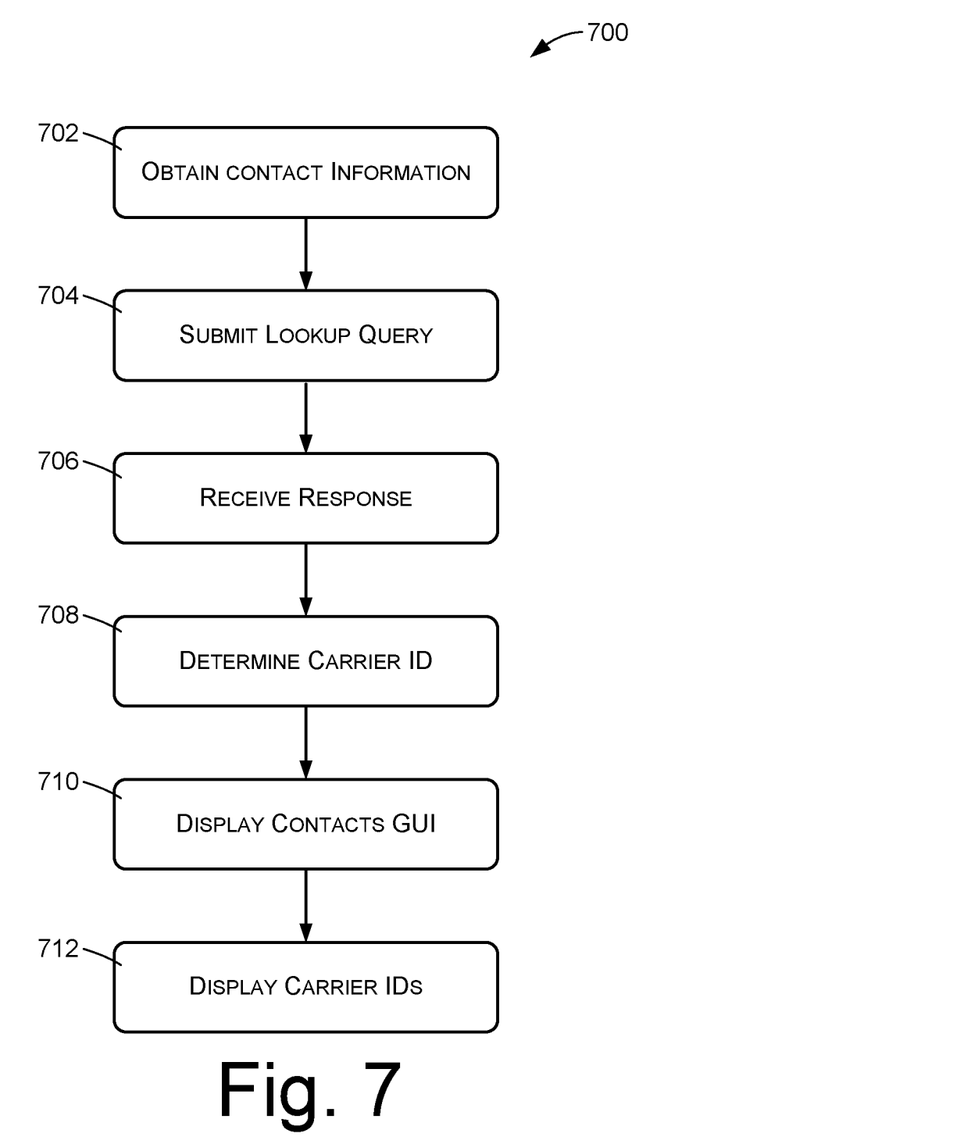
FIG. 7 is a flow diagram showing an example method of displaying contact information and carrier IDs.

FIG. 7 illustrates an example method 700 that may be performed in certain embodiments. The method 700 may be performed by any client device or other device, including a user device such as the device 100 of FIGS. 1-4, the account website 608, or any other entity. In some cases, the method 700 may be performed by an application that runs on a user device such as a smartphone. The application may comprise a native application, an installed, over-the-top (OTT) application, a web browser, an application that executes within or under the control of a web browser, an executable part of a web page, etc. As another example, the method 700 may be performed one or more Internet servers or other network servers that generate graphical content such as HTML pages for display on user devices, and/or by applications that run on such servers. Furthermore, in some embodiments the method 700 may be performed by a combination of different devices, servers, services, applications, and/or other entities.

An action 702 comprises obtaining contact information for one or more contacts. The action 702 may comprise accessing a contacts database that stores contact information. In some cases, the contacts database may store what is often referred to as a personal address book of a user. The contact information stored within such a personal address book may include names, addresses, telephone numbers, email addresses, pictures, notes, and so forth, corresponding respectively to individual people or businesses for a given user.

An action 704 comprises submitting a lookup query to determine carrier-specific information for one or more cellular telephone numbers specified by the contacts database. The lookup query may in some embodiments comprise a query to a mapping service and/or to an ENUM server as described above. In either case, the lookup query specifies the one or more cellular telephone numbers. In some embodiments, the query may specify all of the cellular telephone numbers stored by the contacts database.

An action 706 comprises receiving a response to the lookup query. The response indicates, for each submitted telephone number, identifying information corresponding to the cellular communication carrier that provides cellular communication services for one or more devices associated with that telephone number. In some embodiments, the response may indicate a name, a logo, or some other identifier that is uniquely associated with a carrier. In other embodiments, the response may indicate a URI, a hostname, an IP domain, or other data that includes one or more elements from which the carrier associated with a particular telephone number can be identified, and/or from which a carrier ID may be identified.

An action 708 comprises determining a carrier ID for each submitted telephone number. A carrier ID may comprise text such as the name of the carrier, or may comprise graphics such as a logo of the carrier. In some embodiments, the carrier ID may be specified directly by the response received in the action 706. In other embodiments, the carrier ID may be determined with reference to the information received in the response. For example, the response may provide a hostname or a domain name associated with a carrier, and the action 708 may comprise referring to a pre-populated cross-reference that maps hostnames or domain names to respective carrier IDs.

An action 710 comprises generating, providing, and/or displaying a contacts GUI that displays and/or lists contact information for one or more contacts of the contacts database. FIGS. 1-4 show examples of such a GUI, although a contacts GUI may take many different forms. The displayed contact information may include a cellular telephone number for each of multiple contacts. When the GUI is provided by an application running on a user device, the application may generate the GUI with appropriate calls to the operating system of the user device. When the GUI is provided by a web server, an application on the web server may generate HTML code specifying graphical content, and may provide the HTML code to an HTML browser or other application running on a user device, which responds by displaying graphics specified by the HTML code.

An action 712 comprises displaying the carrier IDs that have been obtained or determined in the action 708. The carrier IDs may be displayed along side or along with the corresponding contacts and telephone numbers, indicating, for each cellular telephone number of each contact, the cellular communications carrier that provides cellular communication services for devices associated with that telephone number.

Figures 8, 9:
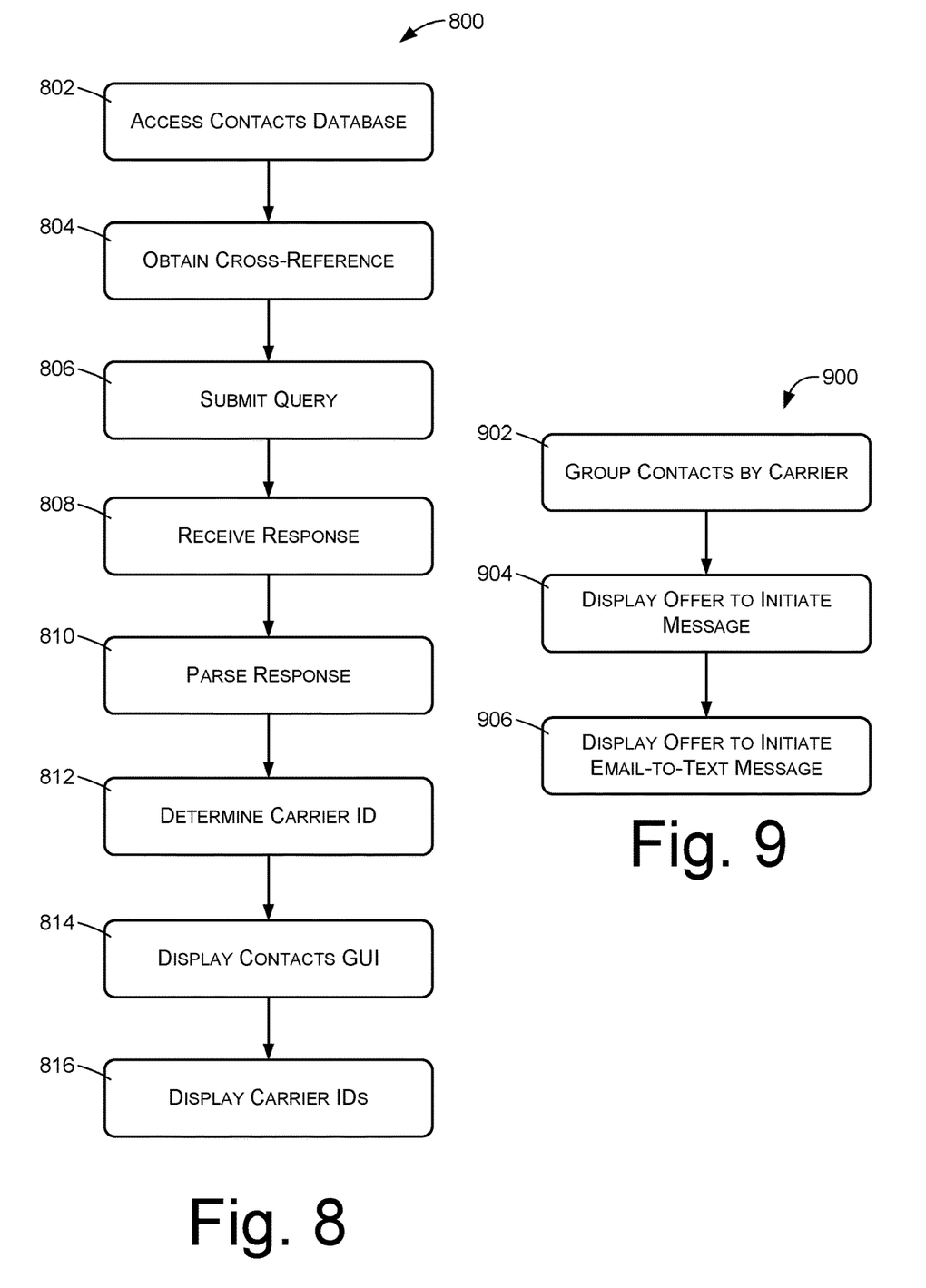
FIG. 8 is a flow diagram showing another example method of displaying contact information and carrier IDs.
FIG. 9 is a flow diagram showing additional actions that may be performed in conjunction with the methods shown in FIGS. 7 and 8.

FIG. 8 illustrates another example method 800 that may be performed in certain embodiments. The method 800 may be performed by any one or more devices, servers, applications, and/or other components or entities. For purposes of discussion, the method 800 will be described as being performed in the environment shown in FIG. 6, although the method may also be performed in other environments using different computational and networking architectures.

An action 802 comprises accessing a contacts database to obtain contact information for multiple contacts. As described above, the contact information may indicate cellular telephone numbers of different ones of the multiple contacts. The contacts database may be maintained on a user device such as a smartphone, tablet computer, desktop computer, etc. Alternatively, the contacts database may be maintained on a network-accessible device or by a network-accessible service. In the environment of FIG. 6, a contacts database may comprise the database 606 and/or the database 612.

An action 804 comprises obtaining a cross-reference of hostnames to identifiers of cellular communication carriers. For example, the smartphone 602 may query the mapping service 614 to obtain a such a cross reference. The cross-reference itself may comprise a table or other data structure that lists multiple host names, domain names, or URIs, and respectively corresponding carriers or carrier IDs.

An action 806 comprises submitting a query to a service such as the mapping service 614 or the ENUM server 618. The query specifies one or more cellular telephone numbers, corresponding to respective contacts of the contacts database. In some embodiments, the action 806 may comprise submitting an individual query for each cellular telephone number. In other embodiments, the action 806 may comprise submitting a query that specifies multiple telephone numbers, such as all the telephone numbers of the contacts database. In some embodiments, the action 806 may comprise submitting the query directly to an ENUM server, requesting that the ENUM server perform a reverse DNS lookup with respect to a particular specified telephone number.

An action 808 comprises receiving a response to the query from the mapping server. Generally, the response indicates identifying information of cellular communication carriers that provide services for the telephone numbers specified by the query. In the described embodiment, the response indicates a URI corresponding to each cellular telephone number that was specified by the query.

An action 810 comprises parsing the received URI to determine a hostname specified by the URI. For example, the URI may be of the format userID@comm.domain.com, where domain.com is a hostname. The action 810 may comprise parsing the URI to determine the portion of the URI that represents the hostname and producing a text string corresponding to the hostname.

An action 812 comprises determining a carrier ID or other identifier of a cellular communication carrier that is associated with the hostname. For example, the action 812 may comprise referencing the previously obtained cross-reference, based on the hostname determined in the action 810, to determine the identifier of the cellular communication carrier. In some cases, the carrier ID may comprise text. In other cases, the carrier ID may comprise a logo or other graphics associated with the carrier.

An action 814 comprises displaying or listing the multiple contacts on a display of the device. For example, the action 814 may comprise generating and/or providing a GUI that enumerates, lists, or otherwise shows individual contacts and associated telephone numbers.

An action 816 comprises showing or displaying, in association with each contact or cellular telephone number, the carrier ID associated with that contact or telephone number. For example, the carrier IDs may be displayed within the GUI of the action 814. For each telephone number, the associated carrier ID comprises the carrier ID identified in the action 812, and is therefore the carrier ID of the cellular communications provider that provides cellular communication services for the device or devices associated with the telephone number.

In cases where multiple contacts are displayed within the GUI, the action 816 comprises displaying carrier IDs for respectively corresponding ones of the contacts. For each one of the contacts, the displayed identifier indicates which of multiple cellular communication carriers provides cellular communication services for the contact, for the telephone number of the contact, and/or for devices associated with the telephone number of the contact.

FIG. 9 shows additional actions 900 that may be performed in certain embodiments, in conjunction with the method 800. In certain situations, and/or in response to user navigation with the GUI, an action 902 may be performed, which comprises visibly grouping different sets of the contacts and/or otherwise arranging the contacts in accordance with their associated carriers. Each set comprises those contacts for which a corresponding one of the multiple cellular communication providers provides cellular communication services.

In certain situations or GUIs, an action 904 may be performed, which comprises displaying, in association with each contact, an offer to initiate a message to the contact, where the message suggests that the contact switch carriers to the home carrier of the user. Assuming that the user of the GUI has services from a particular carrier, the action 904 may be performed for any contacts that have cellular communications services from any different carriers. The action 904 may comprise displaying a selectable control along with each such contact, where selecting the control initiates a promotional SMS text message to the contact. The message may be composed to promote the home carrier of the user and may suggest that the contact switch to the home carrier. The message may be sent on behalf of the user, such as being sent from the telephone number of the user. The message may also mention that the user has provided or endorsed the message.

In certain situations, or GUIs, an action 906 may be performed, which comprises showing, in association with each contact, an offer to send an email-to-text message to the contact. The action 906 may comprise displaying a selectable control along with each contact for which the associated carrier can be determined, where selecting the control initiates an email-to-text message to the contact. The action 906 may comprise determining an email-to-text email address for the contact, using a format that is known to be associated with the carrier of the contact. The action 906 may comprise initiating an email message to the contact using the determined email-to-text email address.

Figure 10:
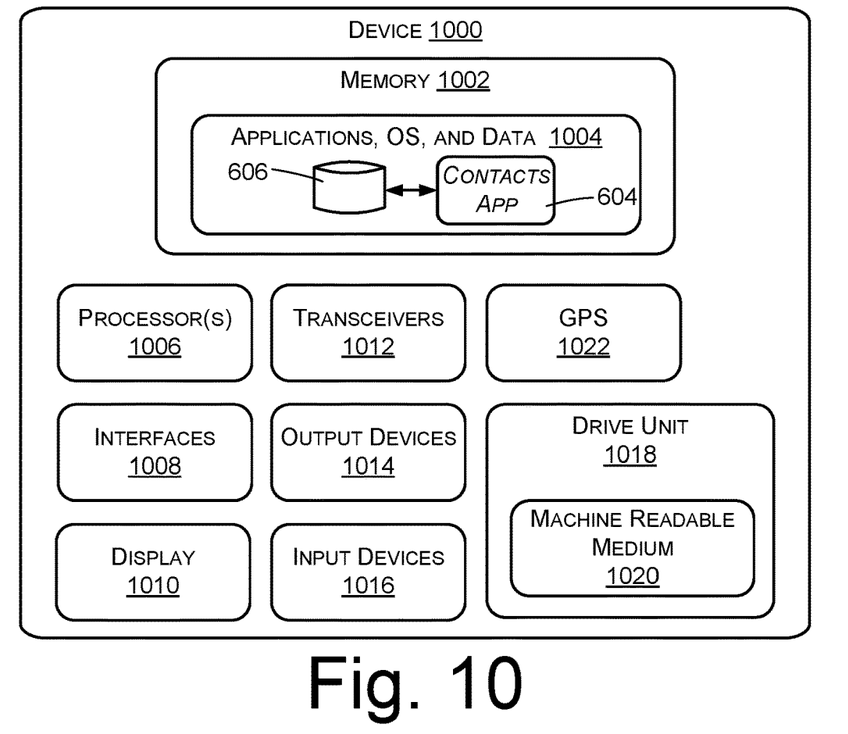
FIG. 10 is a block diagram of an example communication device that may be configured to implement certain of the techniques described herein.

FIG. 10 illustrates an example communication device 1000 in accordance with various embodiments. The device 1000 is illustrative of the communication device 100 described above.

The device 1000 may include a memory 1002, which may store applications, an operating system (OS), and data 1004. The device 1000 further includes processor(s) 1006, interfaces 1008, a display 1010, radio transceivers 1012, output devices 1014, input devices 1016, and a drive unit 1018 including a machine readable medium 1020.

In various embodiments, the memory 1002 includes both volatile memory and non-volatile memory. The memory 1002 can also be described as non-transitory computer storage media and may include removable and non-removable media implemented in any method or technology for storage of information, such as computer readable instructions, data structures, program modules, or other data. The applications, OS, and data 1004 are stored in the memory 1002. Additionally, in some embodiments, the memory 1002 may include a SIM (subscriber identity module), which is a removable smart card used to identify a user of the device 1000 to a service provider network.

Non-transitory computer-readable media may include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, physical medium which can be used to store the desired information and which can be accessed by the device 1000. Any such non-transitory computer-readable media may be part of the device 1000.

In some embodiments, the processor(s) 1006 is a central processing unit (CPU), a graphics processing unit (GPU), or both CPU and GPU, or other processing unit or component known in the art.

In various embodiments, the interfaces 1008 are any sort of interfaces known in the art. The interfaces 1008 may include any one or more of an Ethernet interface, wireless local-area network (WLAN) interface, a near field interface, a DECT chipset, or an interface for an RJ-11 or RJ-45 port. A wireless LAN interface can include a Wi-Fi interface or a Wi-Max interface, or a Bluetooth interface that performs the function of transmitting and receiving wireless communications using, for example, the IEEE 802.11, 802.16 and/or 802.20 standards. The near field interface can include a Bluetooth® interface or radio frequency identifier (RFID) for transmitting and receiving near field radio communications via a near field antenna. For example, the near field interface may be used for functions, as is known in the art, such as communicating directly with nearby devices that are also, for instance, Bluetooth® or RFID enabled.

In various embodiments, the display 1010 may comprise a liquid crystal display or any other type of display commonly used in telecommunication devices or other portable devices. For example, the display 1010 may be a touch-sensitive display screen, which may also act as an input device or keypad, such as for providing a soft-key keyboard, navigation buttons, or the like.

In some embodiments, the transceivers 1012 include any sort of transceivers known in the art. For example, the transceivers 1012 may include radio radios and/or radio transceivers and interfaces that perform the function of transmitting and receiving radio frequency communications via an antenna, through a cellular communication network of a wireless data provider. The radio interfaces facilitate wireless connectivity between the device 1000 and various cell towers, base stations and/or access points.

In some embodiments, the output devices 1014 include any sort of output devices known in the art, such as a display (already described as display 1010), speakers, a vibrating mechanism, or a tactile feedback mechanism. The output devices 1014 also include ports for one or more peripheral devices, such as headphones, peripheral speakers, or a peripheral display.

In various embodiments, the input devices 1016 include any sort of input devices known in the art. For example, the input devices 1016 may include a microphone, a keyboard/keypad, or a touch-sensitive display (such as the touch-sensitive display screen described above). A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

The device 1000 may also have a GPS (global positioning system) receiver 1022 for determining the current location of the device 1000 based on signals received from satellites.

The machine readable medium 1020 stores one or more sets of instructions (e.g., software) such as a computer-executable program that embodies operating logic for implementing and/or performing any one or more of the methodologies or functions described herein. The instructions may also reside, completely or at least partially, within the memory 1002 and within the processor 1006 during execution thereof by the device 1000. The memory 1002 and the processor 1006 also may constitute machine readable media 1020. In some embodiments, the Applications, OS, and data 604 may include the contacts application 604 and the contacts database 606.

Figure 11:
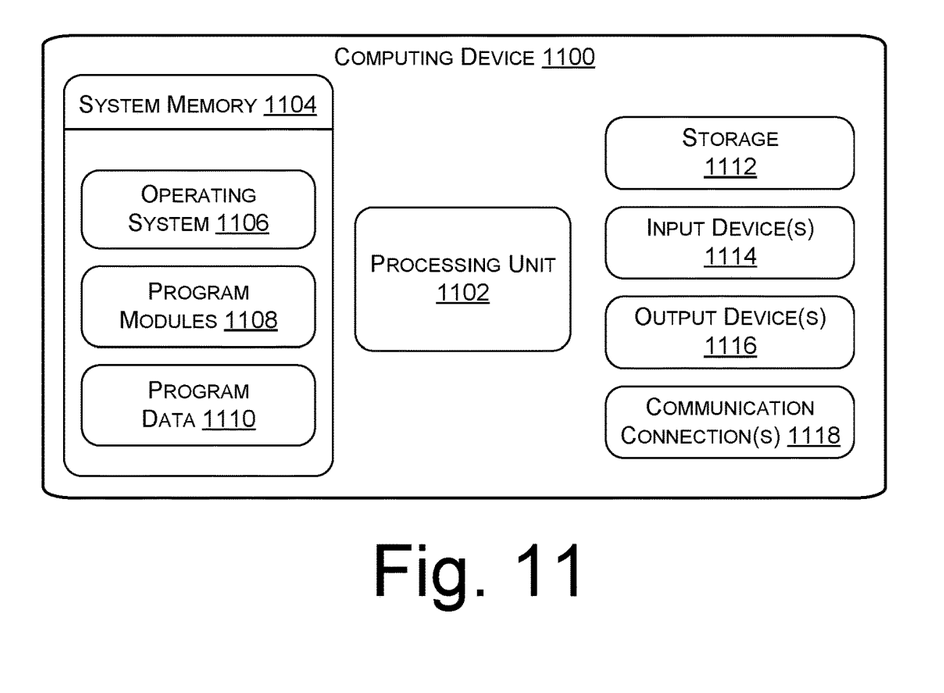
FIG. 11 is a block diagram of an example computing device that may be configured to implement certain of the techniques described herein.

FIG. 11 is a block diagram of an illustrative computing device 1100 such as may be used to implement various components described herein, such as for example the account website 608, the mapping service 614, and/or the ENUM server 618.

In various embodiments, the computing device 1100 may include at least one processing unit 1102 and system memory 1104. Depending on the exact configuration and type of computing device, the system memory 1104 may be volatile (such as RAM), non-volatile (such as ROM, flash memory, etc.) or some combination of the two. The system memory 1104 may include an operating system 1106, one or more program modules 1108, and may include program data 1110.

The computing device 1100 may also include additional data storage devices (removable and/or non-removable)

such as, for example, magnetic disks, optical disks, or tape. Such additional storage is illustrated in FIG. 11 by storage 1112.

Non-transitory computer storage media of the computing device 1100 may include volatile and nonvolatile, removable and non-removable media implemented in any method or technology for storage of information, such as computer readable instructions, data structures, program modules, or other data. The system memory 1104 and storage 1112 are all examples of computer-readable storage media. Non-transitory computer-readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1100. Any such non-transitory computer-readable storage media may be part of the computing device 1100.

In various embodiment, any or all of the system memory 1104 and storage 1112 may store programming instructions which, when executed, implement some or all of the function functionality described above.

The computing device 1100 may also have input device(s) 1114 such as a keyboard, a mouse, a touch-sensitive display, voice input device, etc. Output device(s) 1116 such as a display, speakers, a printer, etc. may also be included. The computing device 1100 may also contain communication connections 1118 that allow the device to communicate with other computing devices.

Although features and/or methodological acts are described above, it is to be understood that the appended claims are not necessarily limited to those features or acts. Rather, the features and acts described above are disclosed as example forms of implementing the claims.

What is claimed is:

1. One or more non-transitory computer-readable media of a device storing computer-executable instructions that, when executed by one or more processors, cause the one or more processors to perform actions comprising:
   receiving cellular communication services from a home cellular communication carrier;
   accessing a contacts database to obtain contact information for multiple contacts, the contact information indicating a cellular telephone number of each of the multiple contacts;
   submitting a query to a network-accessible service, the query specifying a cellular telephone number of a particular contact of the multiple contacts;
   receiving a response to the query from the network-accessible service, the response indicating identifying information of a first cellular communication carrier;
   determining an identifier of the first cellular communication carrier based at least in part on the identifying information;
   listing the multiple contacts on a display of the device while a contact list is being accessed;
   showing on the display, in association with the particular contact, the identifier of the first cellular communication carrier while the contact list is being accessed;
   showing on the display, in association with the particular contact, an offer to send a message to the contact; and
   in response to selection of the offer by a user of the device, initiating the message to the contact on behalf of the user, the message promoting the home cellular communication carrier.

2. The one or more non-transitory computer-readable media of claim 1, wherein:
   the identifying information comprises a hostname of the first cellular communication carrier; and
   the determining is based at least in part on the hostname.

3. The one or more non-transitory computer-readable media of claim 1, wherein:
   the identifying information comprises a uniform resource identifier (URI);
   the actions further comprising parsing the URI to determine a hostname specified by the URI; and
   the determining is based at least in part on the hostname.

4. The one or more non-transitory computer-readable media of claim 1, wherein the identifier comprises text that identifies the first cellular communication carrier.

5. The one or more non-transitory computer-readable media of claim 1, wherein the identifier comprises a logo of the first cellular communication carrier.

6. The one or more non-transitory computer-readable media of claim 1, the actions further comprising displaying identifiers for respectively corresponding ones of the contacts, wherein for each contact of the contacts, the identifier indicates which of multiple cellular communication carriers provides cellular communication services for the contact.

7. The one or more non-transitory computer-readable media of claim 6, the actions further comprising visibly grouping a set of the contacts for which a single cellular communication carrier of the multiple cellular communication carriers provides cellular communication services.

8. The one or more non-transitory computer-readable media of claim 7, wherein the set of contacts is grouped under an associated heading indicating an identity of the single cellular communication carrier of the multiple cellular communication carriers providing the cellular communication service.

9. The one or more non-transitory computer-readable media of claim 1, wherein the message includes:
   a suggestion to the contact that the contact switch to the home cellular communication carrier; and
   an indication that the user endorsed the suggestion.

10. A method comprising:
    providing a graphical user interface that shows a contact list having information corresponding to multiple contacts, the information including cellular telephone numbers;
    submitting a query to obtain information identifying a first cellular communication carrier that provides cellular communication services to a particular contact of the multiple contacts, the query specifying a cellular telephone number of the particular contact;
    showing in the contact list, in association with the particular contact, an identifier corresponding to the first cellular communication carrier;
    showing, in the graphical user interface, in association with the particular contact, an offer to initiate a message to the particular contact; and
    in response to selection of the offer by a user, initiating the message to the particular contact on behalf of the user, the message promoting a second cellular communication carrier.

11. The method of claim 10, further comprising:
    receiving a response to the query, the response indicating a uniform resource identifier (URI) corresponding to the cellular telephone number of the particular contact;
    parsing the URI to determine a hostname specified by the URI; and determining the identifier based at least in part on the URI.

12. The method of claim 10, wherein the identifier comprises at least one of (a) text that identifies the first cellular communication carrier; and (b) a logo of the first cellular communication carrier.

13. The method of claim 10, wherein submitting the query comprises submitting the query to an E.164 Number to URI Mapping (ENUM) server; the method further comprising receiving a response from the ENUM server, the response indicating a service address associated with the particular contact.

14. The method of claim 10, wherein the graphical user interface further shows a call history that specifies the cellular telephone number of the particular contact.

15. The method of claim 10, wherein the graphical user interface lists multiple contacts, the particular contact being among the multiple contacts.

16. A communication device comprising:
one or more processors;
a display;
one or more non-transitory computer-readable media storing computer-executable instructions that, when executed on the one or more processors, cause the one or more processors to perform actions comprising:
accessing a contacts database to obtain contact information for multiple contacts, the contact information indicating a cellular telephone number of each of the multiple contacts;
listing at least some of the contact information on the display;
for each contact of the multiple contacts, determining a cellular communication carrier of multiple cellular communication carriers that provides cellular communication services for the contact; and
showing on the display, while a contact list is being accessed and in association with each contact of the multiple contacts, an identifier of the cellular communication carrier that provides cellular communication services for the contact, the contact list being displayed such that a set of the multiple contacts for which a single cellular communication carrier of the multiple cellular communication carriers provides cellular communication services are grouped together under an associated heading identifying the single cellular communication carrier.

17. The communication device of claim 16, wherein determining the cellular communication carrier comprises submitting a query to a network-accessible service, the query specifying at least one cellular telephone number.

18. The communication device of claim 16, wherein the identifier comprises at least one of (a) text that identifies the cellular communication carrier; and (b) a logo of the cellular communication carrier.

19. The communication device of claim 16, wherein determining the cellular communication carrier comprises obtaining a uniform resource identifier (URI) corresponding to one of the multiple contacts.

20. The communication device of claim 16, the actions further comprising:
showing one the display, in association with a particular contact, an offer to initiate a message to the particular contact; and
in response to selection of the offer, initiating the message to the particular contact, the message promoting a second cellular communication carrier.

* * * * *